United States Patent Office 3,299,125
Patented Jan. 17, 1967

3,299,125
PROCESS FOR THE PREPARATION OF AROMATIC CARBOXYLIC ACIDS
Yataro Ichikawa, Iwakuni-shi, Japan, assignor to Teijin Limited, Osaka, Japan, a corporation of Japan
No Drawing. Filed Apr. 24, 1964, Ser. No. 362,488
Claims priority, application Japan, May 1, 1963, 38/22,901
11 Claims. (Cl. 260—524)

This invention relates to a process for the preparation of aromatic carboxylic acids by reaction with molecular oxygen of an aromatic compound having at least one oxidizable group selected from a group consisting of methyl, hydroxymethyl and aldehyde, as a substituent attached to its nuclear carbon or carbons.

As the aromatic compounds used as the starting material of this invention, are those having one or more of such oxidizable groups. When they have two or more of such substituent oxidizable groups, each of them should be separated by at least one unsubstituted nuclear carbon.

The invention relates to a process for the preparation of aromatic carboxylic acids which comprises reacting aromatic compounds having such oxidizable groups as substituents with molecular oxygen such as oxygen and air in the presence of a cobalt-containing catalyst to oxidize all of the oxidizable groups of the aromatic compounds by one step.

Heretofore for the production of aromatic monocarboxylic acids, industrial interests have been drawn to a process of oxidizing aromatic compounds having aliphatic substituents or partially oxidized products thereof in a liquid phase by means of molecular oxygen, and researches have been made on such a process.

In the majority of the cases, addition of a minor amount of a catalyst is effective for that type of oxidizing reaction; many catalysts have been suggested for this purpose including simple substances or compounds of valency-variable metals such as cobalt, chromium, manganese, lead, iron, copper, nickel and vanadium, and simple substances or compounds of cerium, selenium, silver, zinc and uranium.

Conventionally, these catalysts are used in an amount of, as a metal, $1 \times 10^{-5}$ to $1 \times 10^{-3}$ gram-atom/mol of the compound to be oxidized.

However, while with these known methods using such catalysts it is possible to produce aromatic monocarboxylic acids with relative ease, it is very difficult to produce aromatic polycarboxylic acids by one step oxidation of aromatic compounds having two or more oxidizable groups.

Thus, in accordance with the conventional methods, taking as an example the production of terephthalic acid from p-xylene, in the first step as shown in the reaction Formula 1,

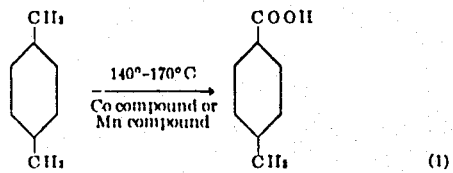

p-xylene is oxidized with air or oxygen in the presence of a cobalt compound such as, for example, cobalt naphthenate or a manganese compound such as manganese naphthenate as the catalyst to form p-toluic acid. Then the p-toluic acid is oxidized with nitric acid as shown in the Formulae 2 below, to produce terephthalic acid.

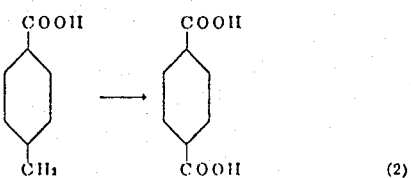

However, the production of terephthalic acid from p-xylene by two-step oxidizing reaction as above is industrially disadvantageous.

Therefore recent attempts have been to produce terephthalic acid by one step oxidation of p-xylene. For example, U.S. Patent No. 2,833,816 discloses an oxidizing method using as the catalyst a combination of an organic acid salt of a heavy metal such as cobalt and manganese with a bromine-containing compound such as ammonium bromide. The Journal of Organic Chemistry, vol. 25, pages 616 (1960) teaches an oxidizing method which uses ozone as a reaction initiator concurrently with an organic acid salt of cobalt as the catalyst. Again U.S. Patents Nos. 2,853,514 and 3,036,122 discloses the combination use as the catalyst of a methylene ketone such as methylethyl ketone with an organic acid salt of cobalt. Further U.S. Patent No. 2,673,217 introduces the combination use as the catalyst of an aliphatic aldehyde with an organic acid salt of cobalt.

However all of the foregoing one-step oxidation methods have one deficiency in common, i.e., besides an organic acid salt of a heavy metal, other additives which are difficult of industrial handling must be co-used. With the process co-using the bromine-containing compound, the corrosion of the apparatus by bromine is remarkable; for the concurrent use of ozone, separate, additional apparatus for producing ozone is required; in the process co-using methylethyl ketone the recovery of the methylethyl ketone is necessary and a portion thereof is inevitably lost; and further, the process using an aldehyde consumes a large amount of the aldehyde.

Whereas, according to the subject invention it is found that by reacting an aromatic compound having the aforesaid substituent or substituents with molecular oxygen in a solvent and in the presence of a catalyst system containing cobalt and at least one metal element selected from the Groups IIIa and IVa of the Periodic Table of which valencies are not variable, aromatic carboxylic acids can be produced by one step at a high yield, and moreover, with industrial ease of operation.

Therefore, the primary object of this invention is to provide a one-step production method of aromatic mono- and poly-carboxylic acids.

Another object of the invention is to provide an industrially useful method for the production of aromatic carboxylic acids at high yield by oxidation of such aromatic compounds.

Still other objects and advantages of the invention will become clear from the following descriptions.

More detailed explanation of the invention will follow hereinbelow.

*Starting material.*—Aromatic compounds having at least one oxidizable group selected from a group consisting of methyl, hydroxymethyl and aldehyde, as substituent attached to its nuclear carbon or carbons may be used, provided that when two or more of the oxidizable groups are substituted on the nuclear carbons, each of said substituent is spaced for the next substituent or substituents by at least one unsubstituted nuclear carbon.

Examples of such aromatic compounds are: methyl-substituted aromatic compounds such as toluene, m-xylene, p-xylene, mesitylene, monomethyl naphthalene and 2,6-dimethyl naphthalene; aromatic compounds having non-oxidizable substituent groups besides oxidizable methyl group such as m-toluic acid; p-toluic acid, p-chlorotoluene, m-methyl toluate and p-methyl toluate; hydroxymethyl-substituted aromatic compounds such as benzyl alcohol, m- and p-hydroxymethyl toluenes, and m- and p-xylylene glycols; aldehyde-substituted aromatic compounds such as benzaldehyde, m- and p-tolualdehydes, isophthaloaldehyde, terephthaloaldehyde, m- and p-aldehyde benzoic acids and their esters; and those hydroxymethyl-substituted and aldehyde substituted aromatic compounds containing other non-oxidizable substituent groups. As such "non-oxidizable substituents" are meant those groups which are not oxidized to carboxyl groups under the reaction conditions employed in this invention, such as a halogen atom, carboxyl group, carboalkoxy group, alkyl groups other than methyl, a cyano group and a nitro group.

*Catalyst.*—In this invention, a catalyst system containing (A) at least one metal element of which valency is not variable selected from the Groups IIIa and IVa of the Periodic Table, and (B) cobalt is used.

A particularly preferred catalyst system in this invention is a combination of (A) at least one substance selected from the simple substances, organic acid salts, inorganic acid salts, oxides, hydroxides, basic salts, complex compounds and alcoholates of metal elements of the valencies are not variable, belonging to the Groups IIIa and IVa of the Periodic Table (hereinafter shall be referred to as the component A) with (B) at least one substance selected from the group consisting of metal cobalt, organic acid salts, oxides, hydroxides and complex compounds of cobalt. (Hereinafter shall be referred to as the component B.)

In all of the above cobalt-containing compounds of the component B, the cobalt may be in cobaltous or cobaltic form. Such cobaltic salts may be prepared by any of the heretofore known methods, such as reacting $O_3$, $H_2O_2$, inorganic or organic peroxides and peracids or other oxidizing agents with cobaltous salts, or by electrolytic oxidation.

The present invention is satisfactory as long as the above components A and B are conjointly present in the reaction system. Therefore, the said two components A and B may be added to the solvent to be used in this invention outside the reaction vessel and then the mixture may be put in the reaction vessel, or, the two components A and B may be directly added to the reaction vessel.

*Component A.*—The component A which is a constituent of the catalyst of this invention is selected from the group consisting of simple substances and the compounds thereof of the metal elements of which the valencies are not variable belonging to the Groups IIIa and IVa of the Periodic Table. The said Group IIIa referred to in this invention includes lanthanid and actinide elements.

While any element belonging to the Group IIIa or IVa and of which the valency is not variable can serve as the metal element of the component A of this invention, those particularly preferred are scandium (Sc), yttrium (Y), lanthanum (La), neodymium (Nd), gadolinium (Gd), thorium (Th), zirconium (Zr) and hafnium (Hf).

As the said component A, either simple substances or the following compounds of the above-named metal elements are preferred. That is, as the organic acids to form the organic acid salts of the elements of the component A, any acid of an aliphatic-, cycloaliphatic-, aromatic- and carboxylic-type may be used. Those preferred are the lower aliphatic acids such as acetic, propionic, n- or isobutyric acids, the long chain aliphatic and cycloaliphatic carboxylic acids conventionally used in production of a metallic soap, such as stearis, palmitic, lauric and naphthenic acids, and benzoic, toluic and phthalic acids.

As the inorganic acids to form inorganic acid salts of the elements of the component A, carbonic, hydrochloric, phosphoric and nitric acids, for example, are preferred.

As the basic salts, for example, basic-organic acid salts, basic-inorganic acid salts and basic-halogenides of the metal elements of the component A are useful, those particularly preferred being basic-organinc acid salts.

As the complex compounds, for example, acetyl acetonate of the formula

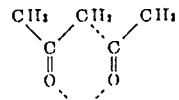

and acetyl acetate of the formula

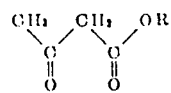

etc., are useful.

As the alcoholates, alcoholates of the above metal elements with, for example, aliphatic alcohols such as methanol, ethanol, propanol, butanol and octanol, and polyhydric alcohols such as ethylene glycol and glycerin are used.

Furthermore, hydroxides and oxides of the above metal elements are also effective as the component A.

*Component B.*—Simple substance or compounds of cobalt are used as the component B for forming the catalyst of this invention. As the compounds, organic acid salts, oxides, hydroxides and complex compounds can be advantageously used.

The same organic acids as named in regard to the component A can be used as those for forming the organic acid salts of cobalt. Inter alia, lower aliphatic acids such as formic, acetic, n-propionic, and normal- or isobutyric acids are preferred, the most preferred being normal-type lower aliphatic acids.

The preferred complex compounds of cobalt are, for example, acetylacetonate and acetyl acetate of the above formulae.

Again any oxide and hydroxide of cobalt is useful as the component B.

Further, the most preferred combination catalyst of the components A and B is composed of at least one compound selected from the group consisting of organic acid salts, oxides, hydroxides and basic salts of zirconium and at least one compound selected from the group consisting of organic acid salts, oxides and hydroxides of cobalt.

The combination catalyst composed of the aforesaid two components A and B used in this invention preferably has a ratio of the metal element contained in the component A, to the cobalt component B in terms of atomic ratio, of 100:100–1, more preferably 100:50–5.

In the oxidation reaction which is the object of this invention, the aforesaid component B (Co-containing component) exhibits catalytic activity by itself, whereas the component A alone does not show substantial catalytic activity.

Whereas, when the component A is combined with the component B, the desired catalytic activity is increased over the case of using the component B alone, and particularly when the two components are used at the above-specified ratio, the catalytic effect is much greater than that of the component B alone.

In this invention, the combination catalyst of the components A and B is preferably used in such an amount as, based on the metal atom of cobalt, at least 0.05 gram-atom, particularly no less than 0.1 gram-atom, per 1 gram-mol of the substance to be oxidized (the starting material). There is no critical upper limit for the amount of use of the catalyst, but increase of the catalyst as more than 1.5 gram-atom of cobalt per one gram-mol of the substance to be oxidized brings about no additional advantages. Therefore the upper limit can be determined from economical considerations.

The catalyst useful in this invention needs not be always composed exclusively of the components A and B. For example, besides the said two components the simple substances or compounds of the type mentioned hereinabove as to the component A of the following metals may be used.

Magnesium (Mg), copper (Cu), strontium (Sr), zinc (Zn), cadmium (Cd), mercury (Mg), aluminum (Al), lead (Pb), germanium (Ge), tin (Sn), tantalum (Ta), antimony (Sb), bismuth (Bi), silver (Ag), nickel (Ni), iron (Fe), rubidium (Rb), cesium (Cs), beryllium (Be), titanium (Ti), gallium (Ga), boron (B), silicon (Si), selenium (Se), tungsten (W), manganese (Mn) and platinum (Pt).

As the third component to be added, besides the above metals or metal compounds, ammonium salts of organic acids such as ammonium acetate can also be used.

By the addition of such third component, in some cases the catalytic activity of the aforesaid combination catalyst of the components A and B may be somewhat increased.

*Solvent.*—According to this invention, the aforesaid starting material (material to be oxidized) is, in the presence of the said catalyst, reacted with molecular oxygen in a solvent.

As the solvent, such a substance which is stable under the oxidation conditions employed in this invention, or which may be oxidized but as the result forms a stable liquid under the oxidation condition is useful. Among such substances, particularly preferred are, for example, acetic, propionic and butyric acids.

These solvents or media may be used singly or as mixtures of two or more of the compounds. Again they may be used at any optional ratio to the substance to be oxidized, generally employed range being 0.5–20 parts of the medium per 1 part of the substance to be oxidized, which is desirably 1–10 parts and most preferably, 2–5 parts.

*Reaction conditions.*—The molecular oxygen used in this invention may be substantially 100% oxygen gas, or gaseous mixtures containing oxygen gas at lower concentrations, for example, air.

The total amount of oxygen to be fed into the reaction system is within the range of 1–1000 mols, preferably 5–100 mols, per 1 mol of the substance to be oxidized.

The reaction temperature may vary depending according to the type of the desired oxidized product, but generally it is within the range of 50–150° C., preferably 80–130° C.

The pressure may vary from the normal pressure to 200 kg./cm.$^2$ or even higher. Usually employed is normal pressure to 100 kg./cm.$^2$, the preferred range being from the normal pressure to 60 kg./cm.$^2$. In terms of partial pressure of oxygen, normally at least 0.1 kg./cm.$^2$, particularly 0.5 kg./cm.$^2$ or higher is suitable.

The process of this invention may be performed in any manner as batchwise, intermittent, continuous or re-cycling system.

In practicing the process of this invention, the walls of the reaction vessel may be of any material as long as it has corrosion-resistance, and are suitably constructed of stainless steel, for example, nickel-chromium stainless steel which contains at least one metal selected from the group consisting of molybdenum, copper, titanium, columbium and tantalum.

According to the invention, for example when p-xylene is oxidized the terephthalic acid the yield becomes 70 (mol) percent or higher; which can be raised as high as 80% or even higher under the preferred reaction conditions. Again in case of oxidizing toluene, although the conversion ratio obtainable with the use of conventional amount of catalyst is 40–50%, with this invention substantially 100% conversion is achieved.

Thus the process of this invention is industrially advantageous in that, without addition of any of the additives as aforenamed, the oxidation can be performed at temperatures lower than the conventionally employed level by 30–50° C.

Further, the thus obtained aromatic carboxylic acid can be separated and recovered from the reaction liquid by accepted means such as solvent-distillation or filtration, in accordance with the physical property of the specific product, and further refined by purification means which are known per se.

Hereinafter the invention will be explained with reference to the examples, wherein unless otherwise specified, parts are by weight.

EXAMPLE A

A reaction vessel provided with a stirrer, a gas inlet at its lower part and a gas outlet at its higher part was charged with 21.6 parts of p-xylene (0.314 mol part), 180 parts of acetic acid and the catalyst as specified below. While the inside temperature was maintained at 100° C. and the stirrer was operated at 1200 r.p.m., oxygen was passed through the vessel at normal pressure. The flow rate of the oxygen was controlled to make the amount of gas discharged from the outlet 8 parts by volume per minute. The reaction was continued until substantially no further absorption of oxygen was observed (about 24 hours). After 3–4 hours from the initiation of the reaction, the reaction system turned dark green, and during the 4th–5th hours to the 10th–12th hours absorption of oxygen was most conspicuous. Thereafter the rate of absorption decreased.

At the time of the highest rate of absorption, it became as high as 50–60 parts by volume per minute. After the termination of the reaction, the reaction mixture was separated by filtration, thoroughly washed with acetic acid and dried. The terephthalic acid yield in each of the examples calculated from the analysis of the dried product was as in the table below.

*Table 1*

| Experiment No. | Catalyst (part) | | | | Amount of $H_2T$* obtained (part) | $H_2T$ yield (percent) |
|---|---|---|---|---|---|---|
| A-1 | $Co(OAc)_2 \cdot 4H_2O$ | 4.8 | $HfO_2$ | 0.42 | 18.87 | 55.83 |
| A-2 | $Co(OAc)_2 \cdot 4H_2O$ | 4.8 | $Th(OH)_4$ | 0.232 | 19.99 | 59.14 |
| A-3 | $Co(OAc)_2 \cdot 4H_2O$ | 4.8 | $ZrO(OAc) \cdot nH_2O$ | 0.418 | 21.16 | 62.60 |
| A-4 | $Co(OAc)_2 \cdot 4H_2O$ | 4.8 | $ZrO(OAc) \cdot nH_2O$ | 0.418 | 22.40 | 66.27 |
| A-5 | $Co(OAc)_2 \cdot 4H_2O$ | 4.8 | $ZrO(OAc) \cdot nH_2O$ | 0.418 | 20.54 | 60.77 |
| A-6 | $Co(OAc)_2 \cdot 4H_2O$ | 4.8 | $Sc_2O_3$ | 0.3758 | 20.44 | 60.47 |
| A-7 | $Co(OAc)_2 \cdot 4H_2O$ | 4.8 | $Nd_2O_3$ | 0.673 | 25.42 | 75.21 |
| A-8 | $Co(OAc)_2 \cdot 4H_2O$ | 4.8 | $Th(OAc)_4$ | 0.844 | 21.54 | 63.73 |
| A-9 | $Co(OAc)_2 \cdot 4H_2O$ | 4.8 | $Y_2O_3$ | 0.451 | 20.80 | 61.54 |
| A-10 | $Co(OAc)_2 \cdot 4H_2O$ | 4.8 | $\{Zr(OAc)_2 \cdot nH_2O$ / $La(OAc)_3 \cdot nH_2O\}$ | 0.418 / 1.90 | 21.10 | 62.42 |
| A-11 | $Co(OAc)_2 \cdot 4H_2O$ | 4.8 | $Gd_2O_3$ | 0.24 | 18.54 | 54.85 |
| A-12 | $Co(OAc)_2 \cdot 4H_2O$ | 4.8 | $ZrO \cdot Cl_2 \cdot 8H_2O$ | 0.62 | 21.62 | 63.96 |
| A-13 | $Co(OAc)_2 \cdot 4H_2O$ | 4.8 | $ZrO_2 \cdot nH_2O$ | 0.24 | 23.90 | 70.80 |
| A-14 | $Co(OAc)_2 \cdot 4H_2O$ | 4.8 | $Zr(OH)_4$ | 0.32 | 22.17 | 65.59 |
| A-15 | $Co(OAc)_2 \cdot 4H_2O$ | 4.8 | $Zr(OCH_2CH_3)_4$ | 0.232 | 19.03 | 56.30 |
| A-16 | $Co(OAc)_2 \cdot 4H_2O$ | 4.8 | $ZrO_2CO_2 \cdot nH_2O$ | 0.32 | 19.79 | 58.55 |
| Control | $Co(OAc)_2 \cdot 4H_2O$ | 4.8 | | | 13.15 | 38.90 |

*$H_2T$=terephthalic acid.

EXAMPLE B

In the similar manner as in Examples A, experiments were carried out except that the catalyst was varied each time as specified in the table below with the indicated results. In all the cases cobalt was added in the amount of 0.02 mol part.

Table 2

| Experiment No. | Catalyst (part) | | | Amount of $H_2T$ obtained (part) | $H_2T$ yield (percent) |
|---|---|---|---|---|---|
| B-1 | Co metal powder | $ZrO(OAc)_2 \cdot nH_2O$ | 0.418 | 22.55 | 66.71 |
| B-2 | CoO | $ZrO(OAc)_2 \cdot nH_2O$ | 0.418 | 22.76 | 67.34 |
| B-3 | $Co(OH)_2$ | $ZrO(OAc)_2 \cdot nH_2O$ | 0.418 | 21.81 | 64.53 |
| B-4 | Co-acetylacetone complex | $ZrO(OAc)_2 \cdot nH_2O$ | 0.418 | 19.38 | 57.34 |
| B-5 | Co-acetoacetic acid ester complex | $ZrO(OAc)_2 \cdot nH_2O$ | 0.418 | 18.50 | 54.73 |
| B-6 | Cobaltic acetate* | $ZrO(OAc)_2 \cdot nH_2O$ | 0.418 | 23.9 | 70.8 |

*The cobaltic acetate was prepared in accordance with the process described in Journal of Chemical Society, 1952.110. The ratio of $Co^{+++}$ to the total cobalt was 40.24%.

EXAMPLE C

A stainless steel pressure vessel provided with a stirrer and a gas inlet at its lower part was charged with 90 parts of p-xylene, 130 parts of glacial acetic acid, and 8 parts of cobaltous acetate ($Co(OAc)_2 \cdot 4H_2O$), and to which $ZrO(OAc)_2 \cdot nH_2O$ was added each time at varied amount as indicated in the table below. At the temperature of 115° C. and the pressure of 20 kg./cm.$^2$G, air was passed through the reaction vessel while the stirrer was operated at 1200 r.p.m. The feed rate of air was, calculated as $O_2$, 0.01 mol/p-xylene mol/min. The reaction was continued until substantially no further absorption of oxygen was observed. After completion of the reaction, the reaction mixture was taken out, and the object terephthalic acid was isolated.

The results were as shown in the table below.

Table 3

| Experiment No. | $ZrO(OAc)_2 \cdot nH_2O$ (part) | $H_2T$ yield (percent) |
|---|---|---|
| C-1 | 0.4 | 72.18 |
| C-2 | 1.2 | 79.14 |
| C-3 | 4.0 | 72.65 |
| Control | | 69.78 |

EXAMPLE D

Twenty (20) parts of p-xylene, 10 parts of cobaltous acetate ($Co(OAc)_2 \cdot 4H_2O$) and 1.5 parts of $$ZrO(OAc)_2 \cdot nH_2O$$

were treated in 130 parts of a solvent varied each time as indicated in the table below, in the similar manner as in Example C. The results were as follows:

Table 4

| Experiment No. | Solvent | $H_2T$ yield (percent) |
|---|---|---|
| D-1 | Acetic acid | 80.03 |
| D-2 | Propionic acid | 77.06 |
| D-3 | n-Butylic acid | 75.11 |

EXAMPLE E 21.6 parts of p-xylene, 180 parts of glacial acetic acid, 4.8 parts of cobaltous acetate ($Co(OAc)_2 \cdot 4H_2O$), 0.418 part of $ZrO(OAc)_2 \cdot nH_2O$ and another additive varied each time at the specified amount as in the table below were treated in the similar manner as in Example A. The results were as follows:

Table 5

| Experiment No. | Additive | Amount (part) | $H_2T$ yield (percent) |
|---|---|---|---|
| Control | | | 67.34 |
| E-1 | $Mg(OAc)_2 \cdot H_2O$ | 0.4007 | 75.94 |
| E-2 | $Cu(OAc)_2 \cdot H_2O$ | 0.6792 | 73.67 |
| E-3 | $NH_4(OAc)$ | 0.5397 | 71.09 |
| E-4 | BeO | 0.2250 | 68.31 |
| E-5 | $Sr(OAc)_2 \cdot \frac{1}{2}H_2O$ | 0.5367 | 75.59 |
| E-6 | $TiO_2$ | 0.7990 | 74.02 |
| E-7 | $Zn(OAc)_2 \cdot 2H_2O$ | 0.9877 | 81.65 |
| E-8 | $Cd(OAc)_2 \cdot 2H_2O$ | 0.5330 | 80.09 |
| E-9 | $Hg(OAc)_2$ | 0.7964 | 81.18 |
| E-10 | $AlO(OAc)_2 \cdot 4H_2O$ | 1.1337 | 76.63 |
| E-11 | $Ga_2O_3$ | 0.3748 | 74.94 |
| E-12 | $H_3BO_3$ | 0.2464 | 77.90 |
| E-13 | $Pb(OAc)_2 \cdot 3H_2O$ | 1.1377 | 83.13 |
| E-14 | $Ge(OAc)_4$ | 0.4936 | 76.15 |
| E-15 | $SiO_2$ | 0.1202 | 73.73 |
| E-16 | $Sn(OAc)_2$ | 0.4734 | 79.44 |
| E-17 | $SeO_2$ | 0.5548 | 79.08 |
| E-18 | $TaO(OAc)_3$ | 0.1495 | 76.65 |
| E-19 | $Sb(OAc)_3$ | 0.0597 | 73.96 |
| E-20 | $BiO(OAc)$ | 0.4544 | 78.61 |
| E-21 | $WO_3$ | 0.5893 | 77.99 |
| E-22 | $Ag(OAc)$ | 0.4996 | 80.44 |
| E-23 | $MnO_2$ | 0.0346 | 79.82 |
| E-24 | $Ni(OAc)_2 \cdot 4H_2O$ | 0.7454 | 84.97 |
| E-25 | $Fe(OAc)_2 \cdot OH$ | 0.3088 | 96.95 |
| E-26 | $Pb(OAc)_2$ | 0.0224 | 77.42 |
| E-27 | $PtO_2 \cdot H_2O$ | 0.7354 | 82.31 |
| E-28 | $Pb(OAc)$ | 0.2310 | 76.42 |
| E-29 | $Cs(OAc)$ | 0.7676 | 79.02 |
| E-30 | $Th(OAc)_4$ | 1.6382 | 76.48 |
| E-31 | $La(OAc)_3 \cdot nH_2O$ | 0.5060 | 75.94 |
| E-32 | $Y_2O_3$ | 0.4516 | 77.90 |
| E-33 | $Sc_2O_3$ | 0.3443 | 78.40 |
| E-34 | $HfO_2$ | 0.0421 | 75.94 |

EXAMPLE F

A titanium pressure vessel having a stirrer and a gas inlet at its lower part was charged with 0.283 mol part of the starting material as each identified below added to 120 parts of the solvent, 20 parts of cobaltous acetate ($Co(OAc)_2 \cdot 4H_2O$), and 2 parts of $ZrO(OAc)_2 \cdot nH_2O$, through which air was passed under the conditions varied each time as indicated in the table below. The reaction was continued until substantially no further absorption of oxygen was observed. The resultant reaction mixture was taken out of the vessel, and the object product was isolated. In all the examples the stirrer was operated at 1200 r.p.m. The results were as follows:

Table 6

| Experiment No. | Starting material | Solvent | Reaction temp. (° C.) | Feed rate of air (part by volume/min.) | Reaction pressure (kg./cm.² G) | Object product | Yield (percent) |
|---|---|---|---|---|---|---|---|
| F-1 | p-Xylene | Acetic acid | 110 | 250 | 20 | Terephthalic acid | 75.81 |
| F-2 | p-Toluic acid | do | 120 | 500 | 20 | do | 71.77 |
| F-3 | p-Xylene plus p-toluic acid (1:0.5). | do | 115 | 300 | 15 | do | 73.02 |
| F-4 | Toluene | do | 110 | 250 | 20 | Benzoic acid | 68.13 |
| F-5 | m-Xylene | do | 100 | 250 | 20 | Isophthalic acid | 72.30 |
| F-6 | m-Toluic acid | do | 120 | 500 | 30 | do | 69.37 |
| F-7 | p-Tolualdehyde | do | 100 | 250 | 10 | Terephthalic acid | 74.50 |

EXAMPLE G

A stainless steel pressure vessel provided with a stirrer and a gas-inlet at its lower part was charged with 20 parts of p-xylene, 130 parts of glacial acetic acid, 15 parts of cobaltous acetate $(Co(OAc)_2 \cdot 4H_2O)$ and 2.25 parts of $ZrO(OAc)_2 \cdot nH_2O$, through which air or oxygen was passed under the conditions varied each time as indicated in the table below. In all the cases the stirrer was operated at 2000 r.p.m. The reaction was continued until substantially no further absorption of oxygen was observed. After completion of the reaction, the reaction mixture was taken out and the object terephthalic acid was isolated. The results were as follows:

Table 7

| Experiment No. | O₂-containing gas | Reaction temp. (° C.) | Reaction pressure | H₂T yield (percent) |
|---|---|---|---|---|
| G-1 | O₂ | 80 | Normal | 68.80 |
| G-2 | O₂ | 100 | do | 72.31 |
| G-3 | Air | 120 | 20 kg./cm.² G | 87.09 |
| G-4 | Air | 130 | 20 kg./cm.² G | 84.11 |
| G-5* | Air | 120 | 20 kg./cm.² G | 88.71 |

*In this experiment cobaltous acetate $(Co(OAc)_2 \cdot 4H_2O)$ was replaced by the same amount (calculated as Co atom) of cobaltic acetate as used in experiment 6 of Example B.

EXAMPLE H

A stainless steel reaction tube provided with a gas-inlet and liquid-outlet at its lower part and a reflux condenser, a gas-outlet and a liquid-inlet at its upper part, was charged with liquid slurry composed of 20 parts of p-xylene, 130 parts of glacial acetic acid, 8 parts of cobaltous acetate $(Co(OAc)_2 \cdot 4H_2O)$ and 1.2 parts of $ZrO(OAc)_2 \cdot 4nH_2O$. While the reaction temperature and pressure were maintained respectively at 120° C. and 20 kg./cm.²G., air was passed through the tube at the rate of 18 parts by volume per minute. The product was continuously withdrawn from the lower part after 7–8 hours of residence time. As the result, terephthalic acid was obtained at the yield of 82.8%.

EXAMPLE I

Under the same reaction conditions as in Example H, oxidation was carried out, and the resultant solid component consisting mainly of terephthalic acid was separated by a centrifuge. The so obtained mother liquor was rectified at 80°–90° C. and the water formed was reduced pressure, and removed. To the remaining mother liquor 20 parts of p-xylene and acetic acid and cobaltous acetate $(Co(OAc)_2 \cdot 4H_2O)$ each in the amount corresponding to its loss during the aforesaid oxidation were added, and the mixture was recycled. After 8 times of the similar recycling, the total terephthalic acid yield reached 84.3%.

I claim:
1. A process for the preparation of aromatic carboxylic acids, which comprises reacting in a solvent stable under conditions of oxidation an aromatic compound having at least one substituent attached to a nuclear carbon wherein said substituent is a member of the group consisting of methyl, hydroxymethyl and an aldehyde radical; when said aromatic compound has at least two of said substituents, each substituent is spaced from the adjacent substituent or substituents by at least one unsubstituted nuclear carbon, with molecular oxygen in the presence of a catalyst system containing in combination (A) at least one substance selected from the group consisting of scandium, yttrium, lanthanum, neodymium, gadolinium, thorium, zirconium and hafnium and the organic acid salts, inorganic acid salts, oxides, hydroxides, basic salts, complex salts and alcoholates thereof, and (B) at least one substance selected from the group consisting of the metal cobalt, organic acid salts, oxides, hydroxides and complex salts of the metal cobalt.

2. The process of claim 1 in which as the catalyst, a combination of at least one compound selected from the group consisting of organic acid salts, oxides, hydroxides and basic salts of zirconium with at least one compound selected from the group consisting of organic acid salts, oxides and hydroxides of cobalt is used.

3. The process according to claim 1 wherein the catalyst system contains in addition to at least one substance selected from components A and B at least one metal selected from the group consisting of magnesium (Mg), copper (Cu), strontium (Sr), Zinc (Zn), cadmium (Cd), mercury (Hg), aluminum (Al), lead (Pb), germanium (Ge), tin (Sn), tantalum (Ta), antimony (Sb), bismuth (Bi), silver (Ag), nickel (Ni), iron (Fe), rubidium (Rb), cesium (Cs), beryllium (Be), titanium (Ti), gallium (Ga), boron (B), silicon (Si), selenium (Se), tungsten (W), manganese (Mn) and platinum (Pt) is used.

4. The process of claim 1 wherein the solvent is selected from the group consisting of acetic acid, propionic acid and butyric acid.

5. The process of claim 1 in which the aromatic compound is heated to 50–150° C. at the pressure ranging from normal to 200 kg./cm.² together with 1 to 1000 mols of oxygen per mol of the aromatic compound.

6. The process of claim 1 in which para-xylene is used as the aromatic compound to form terephthalic acid.

7. The process of claim 1 in which the reaction is performed batchwise.

8. The process of claim 1 in which the reaction is performed continuously.

9. A process for the preparation of aromatic carboxylic acids, which comprises reacting in a solvent stable under conditions of oxidation an aromatic compound having at least one substituent attached to a nuclear carbon wherein said substituent is a member of the group consisting of methyl, hydroxymethyl and an aldehyde radical; when said aromatic compound has at least two of said substituents, each substituent is spaced from the adjacent substituent or substituents by at least one unsubstituted nuclear carbon, with molecular oxygen in the presence of a catalyst system containing in combination (A) at least one metal element selected from the group consisting of scandium, yttrium, lanthanum, neodymium, gadolinium, thorium, zirconium and hafnium and (B) cobalt at a temperature of 50 to 150° C.

10. The process according to claim 9 wherein the ratio of A to B is 100 atoms to 100–1 atoms.

11. The process of claim 10 in which the catalyst is used at such a ratio that, based on the metal atom of cobalt, per one gram-mol of the aromatic compound, 0.05–1.5 gram-atom of cobalt atom is present.

References Cited by the Examiner

UNITED STATES PATENTS

| | | | |
|---|---|---|---|
| 1,694,122 | 12/1928 | Jaeger | 260—524 |
| 2,959,613 | 11/1960 | Whitfield | 260—524 |
| 3,089,906 | 5/1963 | Saffer et al. | 260—524 |
| 3,163,671 | 12/1964 | Fragen et al. | 260—524 |

LORRAINE A. WEINBERGER, *Primary Examiner.*

S. B. WILLIAMS, *Assistant Examiner.*

UNITED STATES PATENT OFFICE
CERTIFICATE OF CORRECTION

Patent No. 3,299,125                                     January 17, 1967

Yataro Ichikawa

It is hereby certified that error appears in the above numbered patent requiring correction and that the said Letters Patent should read as corrected below.

Column 2, line 11, after "been" insert -- made --; line 66, for "for" read -- from --; column 3, line 28, after "of", second occurrence, insert -- which --; line 72, for "stearis" read -- stearic --; column 9, line 54, for "$ZrO(OAc)_2 \cdot 4nH_2O$" read -- $ZrO(OAc)_2 \cdot nH_2O$ --.

Signed and sealed this 24th day of October 1967.

(SEAL)
Attest:

Edward M. Fletcher, Jr.                                  EDWARD J. BRENNER

Attesting Officer                                          Commissioner of Patents